(12) United States Patent
Chuang

(10) Patent No.: US 7,354,312 B2
(45) Date of Patent: Apr. 8, 2008

(54) SLIM CARD READER

(75) Inventor: Ping-Yang Chuang, 18F., No. 6, Lane 79, Sec. 2, Jianguo S. Rd., Taipei City (TW)

(73) Assignees: A-Data Technology Co., Ltd., Taipei (TW); Ping-Yang Chuang, Taipei (TW)

( * ) Notice: Subject to any disclaimer, the term of this patent is extended or adjusted under 35 U.S.C. 154(b) by 0 days.

(21) Appl. No.: 11/642,602

(22) Filed: Dec. 21, 2006

(65) Prior Publication Data

US 2007/0173125 A1  Jul. 26, 2007

(30) Foreign Application Priority Data

Jan. 23, 2006  (TW) .............................. 95102520 A

(51) Int. Cl.
*H01R 24/00* (2006.01)
(52) U.S. Cl. ....................................... 439/630; 439/946
(58) Field of Classification Search ................ 439/630, 439/638, 660, 945, 946
See application file for complete search history.

(56) References Cited

U.S. PATENT DOCUMENTS 6,738,259 B2 * 5/2004 Le et al. ...................... 361/737
7,075,793 B2 * 7/2006 Le et al. ...................... 361/737

* cited by examiner

*Primary Examiner*—Khiem Nguyen
(74) *Attorney, Agent, or Firm*—Rabin & Berdo, P.C.

(57) ABSTRACT

A slim card reader is disclosed. One end of a shell body has a plugging slot plugged with a memory card, and there are metal connection pins that contact the memory card. The characteristic is the second end of the shell body corresponds to a female plugging slot of the USB port, and on the surface of the end of the shell body corresponding to the female plugging slot, there are a plurality of metal flakes that contact the conducting flakes in the female plugging slot. The key point, which makes a breakthrough in the dimensions of the card reader, is that the present invention doesn't use a conventional USB plugging head design. The metal external mask of the USB plugging head is removed. The limitation caused by the large dimensions of the USB plugging head produced by the format of the metal external mask is overcome.

8 Claims, 5 Drawing Sheets

SLIM CARD READER

BACKGROUND OF THE INVENTION

1. Field of the Invention

The present invention relates to a slim card reader. In particular, this invention relates to a slim card reader that accesses data stored in a memory card.

2. Description of the Related Art

As technology has developed, a variety of apparatuses have become digitalized, such as digital still cameras. As the technology related to data storage and access has substantially developed, memory cards of small dimensions and with large capacities have been developed so that digital still cameras can take a large number of pictures and store the pictures onto the memory card. For matching cameras with different formats, a variety of memory cards with different formats and capacities have been developed, such as the Mini SD, and the Micro SD, etc.

Card readers are interface devices that are used to facilitate interaction between a memory card and computer host so that data stored in the memory cards can be accessed by the computer host and stored in the computer host. In order to match a variety of memory cards of different formats, memory readers in the market can access all kinds of such memory cards. The user does not need to buy a number of memory readers for accessing each memory card of a different format.

The card reader is used as an interface device between the memory cards and a computer host and is accessed by the computer host via a USB port of the computer host. The data in the memory card can be rapidly accessed by the computer host via a hot-plugging method. However, all of the card readers in the market have very large dimensions. Comparing the dimensions of the memory cards with the dimensions of the card readers, any observer will see a stark difference. A larger space is required and the manufacturing cost increases. Because the dimensions of a card reader are large, the card reader is heavy. When the card reader is directly plugged into the USB port of the computer host, it interferes with other devices on its side. Therefore, an additional USB extension cable is required. It is inconvenient for the user.

SUMMARY OF THE INVENTION

One particular aspect of the present invention is to provide a slim card reader that is integrated in a slim shell body. The slim shell body is directly plugged into a female plugging slot of a USB port. The dimensions of the card reader are decreased and it is convenient to carry the card reader around.

Another particular aspect of the present invention is to provide a slim card reader so that the card reader shell body can be directly plugged into a female plugging slot of a USB port. The card reader does not require a USB extension cable.

Furthermore, the slim card reader of the present invention makes a breakthrough in terms of the dimensions of the card reader: the card reader is designed with a slim shell body structure. Interference between the card reader and other devices on its side is avoided. The manufacturing cost of the card reader is also substantially decreased. A USB extension cable is not required. The market competitiveness is thereby increased.

The present invention adopts a rectangular slim shell body as the main body of the card reader. The width and the thickness of the shell body are smaller than the width and the thickness of a USB port. One end of the shell body has a plugging slot that can be plugged with a memory card. In the plugging slot, there are a plurality of metal connection pins that contact the conducting part of the memory card. Another end of the shell body corresponds with the female plugging slot of the USB port. On the surface of the end of the shell body corresponding to the female plugging slot, there are a plurality of metal flakes that contact the conducting flakes in the female plugging slot. In the interior of the memory card's plugging slot, there is a slip-proof structure to prevent the memory card from coming out of the memory card's plugging slot.

The key point of making a breakthrough on the dimension of card reader is that the present invention does not use a conventional USB plugging head design. The metal external mask of the USB plugging head is removed. The limitation caused by the large dimensions of the USB plugging head produced by the format of the metal external mask is overcome. Therefore, interference between the slim card reader and other devices is reduced.

The slim card reader of the present invention integrates the whole functions of a card reader into a slim structure that can be directly plugged into the female plugging slot of the USB port. Because the metal external mask of the USB plugging head is removed, the manufacturing process is simplified, and manufacturing costs reduced. The manufacturing efficiency is thereby increased.

The slim card reader of the present invention implements the whole card reader functions in a slim shell body. The slim shell body has a small appearance and a small outline. The card reader can be rapidly plugged into the female plugging slot of the USB port, and it is convenient for the user to carry it around, such as a wallet, a cell phone hanging ornament, or a necklace etc. The structure is novel and modern, and it is attractive to the younger segment of the consumer market.

For further understanding of the invention, reference is made to the following detailed description illustrating the embodiments and examples of the invention. The description is only for illustrating the invention and is not intended to be considered limiting of the scope of the claim.

BRIEF DESCRIPTION OF THE DRAWINGS

The drawings included herein provide a further understanding of the invention. A brief introduction of the drawings is as follows.

DETAILED DESCRIPTION OF THE PREFERRED EMBODIMENTS

Figure 1:
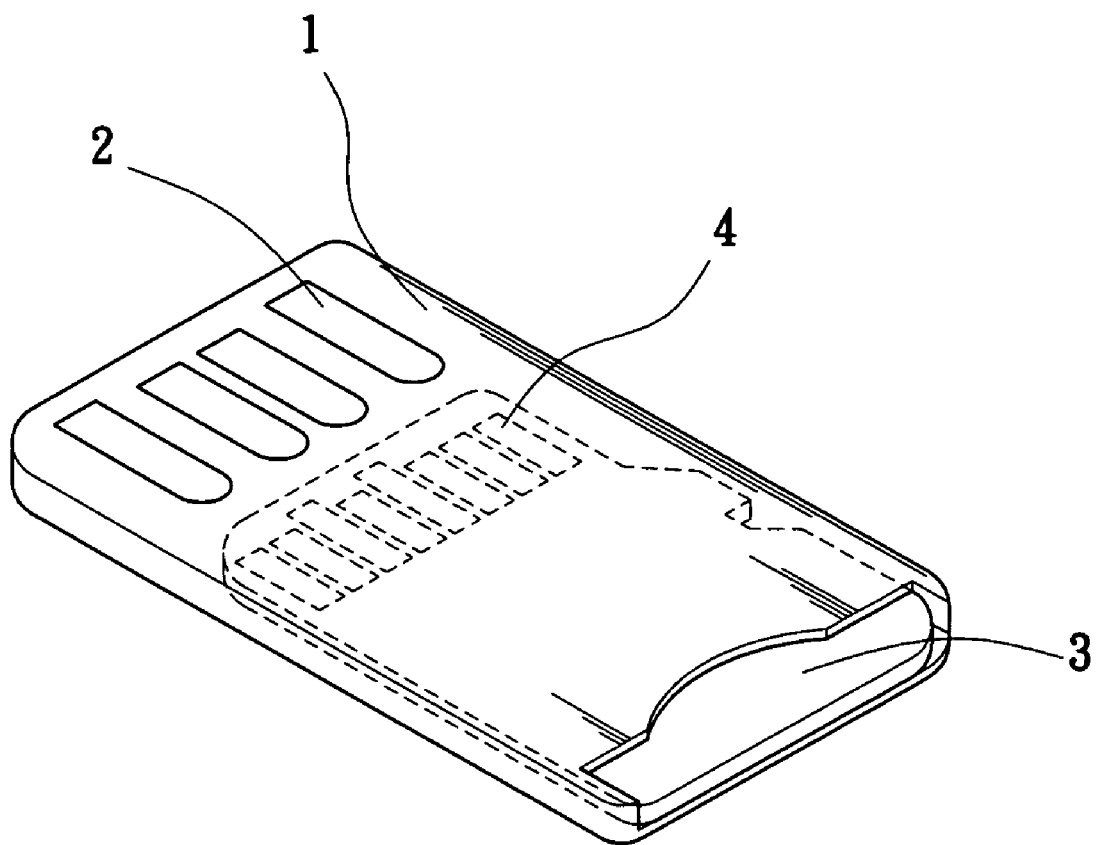
FIG. 1 is a perspective view of the slim card reader of the preferred embodiment of the present invention.

Reference is made to FIG. 1. In a preferred embodiment, the present invention adopts a rectangular slim shell body 1 as a main body of the card reader. The width and the thickness of the shell body 1 are smaller than the width and the thickness of a USB plugging head, for example, less than 3.22 mm×12.5 mm. One end of the shell body 1 has a plugging slot 3 that can be plugged with a memory card. In the plugging slot 3, there are a plurality of metal connection pins 4 that contact the conducting part of the memory card. Another end of the shell body 1 corresponds to the female plugging slot of the USB port. On the surface of the end of the shell body 1 corresponding to the female plugging slot, there are a plurality of metal flakes 2 that contact the conducting flakes in the female plugging slot of the USB port.

According to the previous paragraph, and FIG. 1, the plugging slot 3 is located at a second end of the shell body 1 that is opposite to the metal flakes 2. The plugging slot 3 has a rectangular opening and extends inwards to the interior of the shell body 1. There are a plurality of metal connection pins 4 located at one end of the plugging slot 3 that is opposite to the opening for contacting the conducting part of the memory card so that the data can be transmitted. The opening of the plugging slot 3 is designed as an opening structure that matches the memory card so that it is easy to withdraw the memory card.

Figure 2:
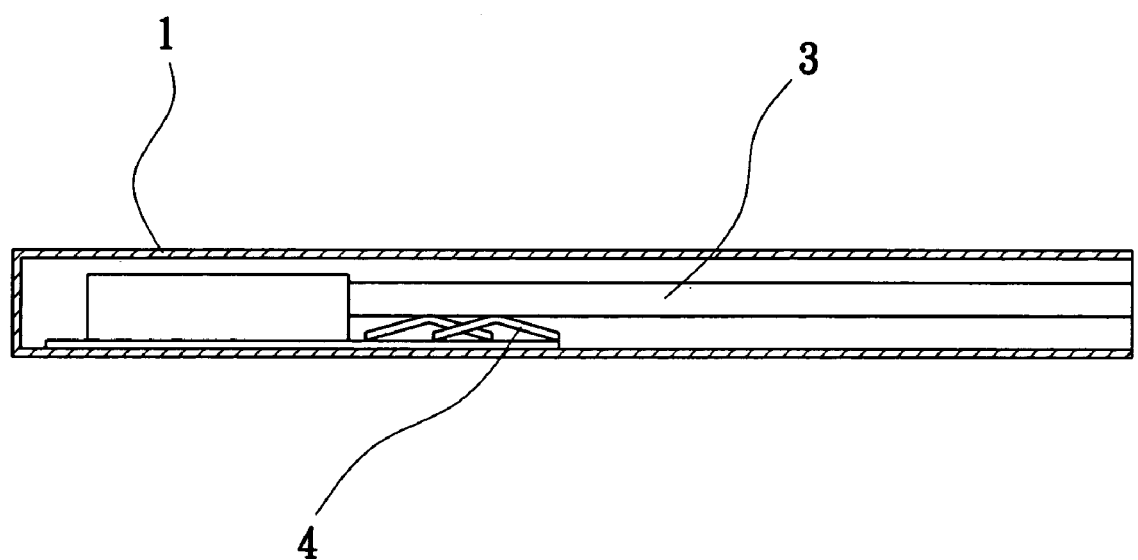
FIG. 2 is a cross-sectional view of the slim card reader of the preferred embodiment of the present invention.

Reference is made to FIG. 2, which shows a side view of the slim card reader. The slim card reader is a rectangular shell body 1. At one end, there is a plugging slot 3 that has a rectangular opening and extends inwards to the interior of the shell body 1. At the inner end of the plugging slot 3, there are a plurality of metal connection pins 4. The dimensions of the plugging slot 3 match the memory card so that the memory card can be plugged into the plugging slot 3. When the memory card is plugged into the interior of the plugging slot 3 via the opening of the plugging slot 3, the conducting part of the memory card contacts the metal connection pins 4 so that the data can be transmitted.

Figure 3:
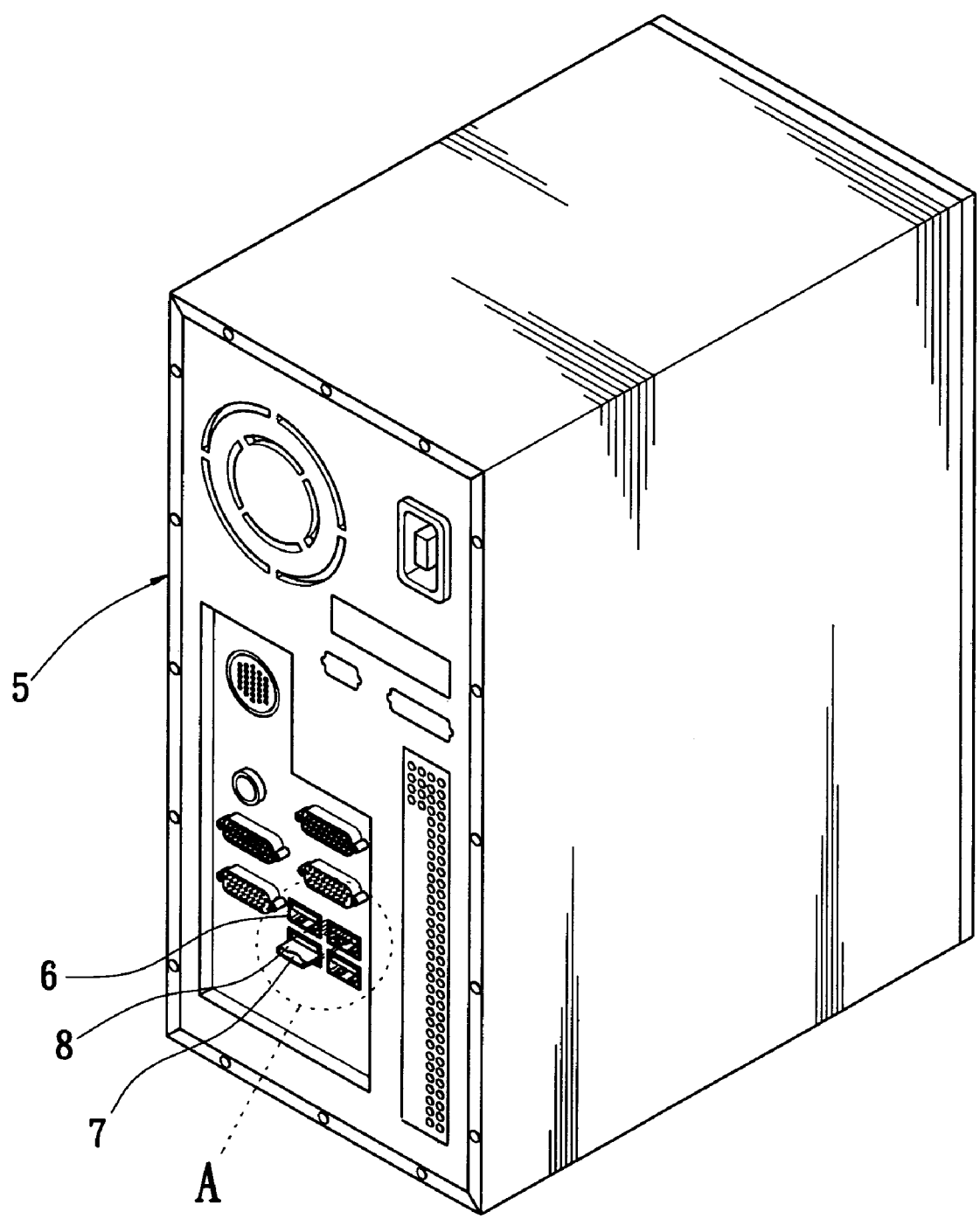
FIG. 3 is a schematic diagram of the application of the slim card reader of the present invention.

Reference is made to FIG. 3, which shows a schematic diagram of an application of the slim card reader of the present invention. At the back side of the computer host 5, there are four USB ports 6 that can be hot-plugged with a USB plugging head. One USB port 6 is plugged with a slim card reader 8 that has been plugged with a memory card 7 in advance. Because the width and the thickness of the slim card reader 8 are smaller than the width and the thickness of the USB port 6, the slim card reader 8 can be directly plugged into the female plugging slot 61 of the USB port 6 (part of the slim card reader's shell body is exposed to the exterior of the USB plugging slot 6). Via the metal flakes located on the surface of the shell body of the slim card reader 8 that contact the conducting flakes in the female plugging slot 61, data can be transmitted.

Figure 3A:
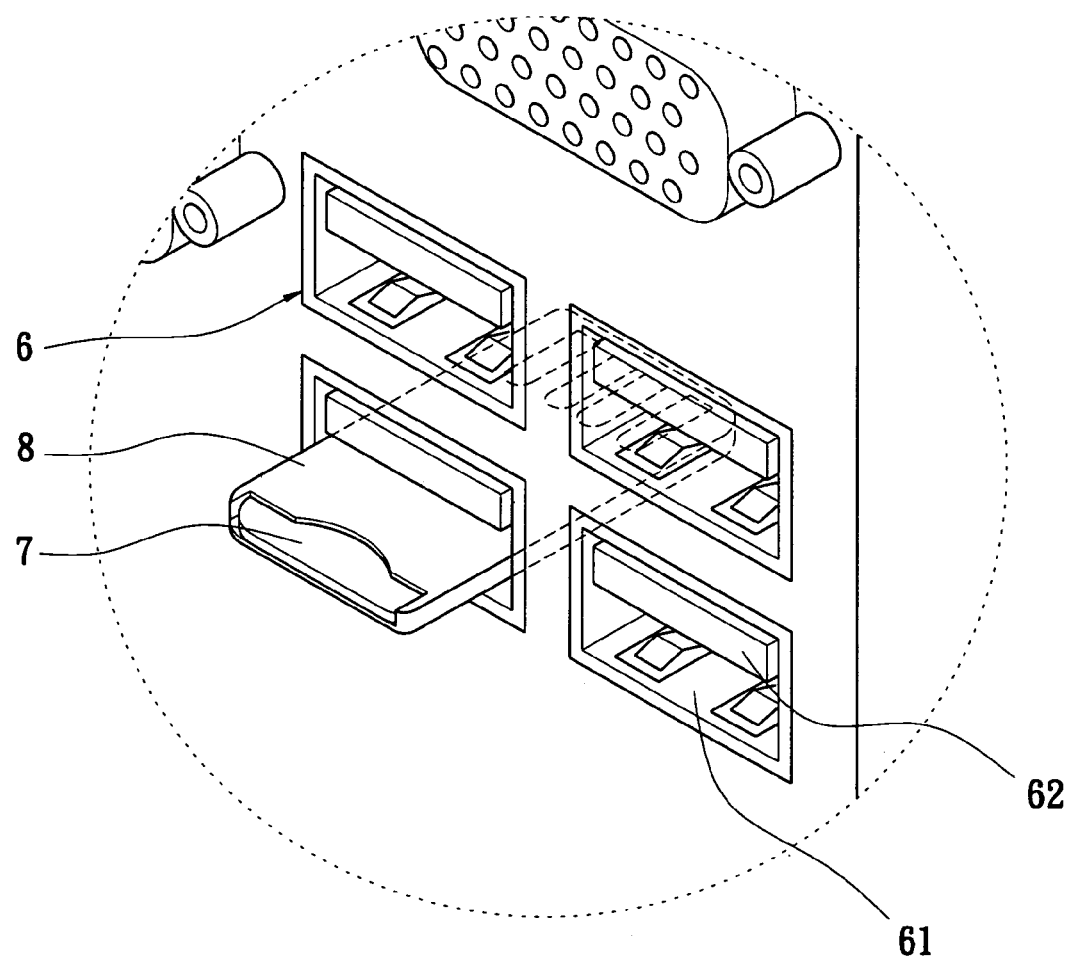
FIG. 3A is an amplified perspective view of part of FIG. 3.

Reference is made to FIG. 3A, which shows an amplified perspective view of part of FIG. 3. The USB port 6 is a general USB port that comprises a female plugging slot 61 and a male connection head 62. In the interior of the female plugging slot 61, there are a plurality of conducting flakes. When the slim card reader 8 is plugged into the USB port 6, the slim card reader 8 is directly plugged into the female plugging slot 61 (the male connection head 62 is not covered by the slim card reader 8.

Figure 4:
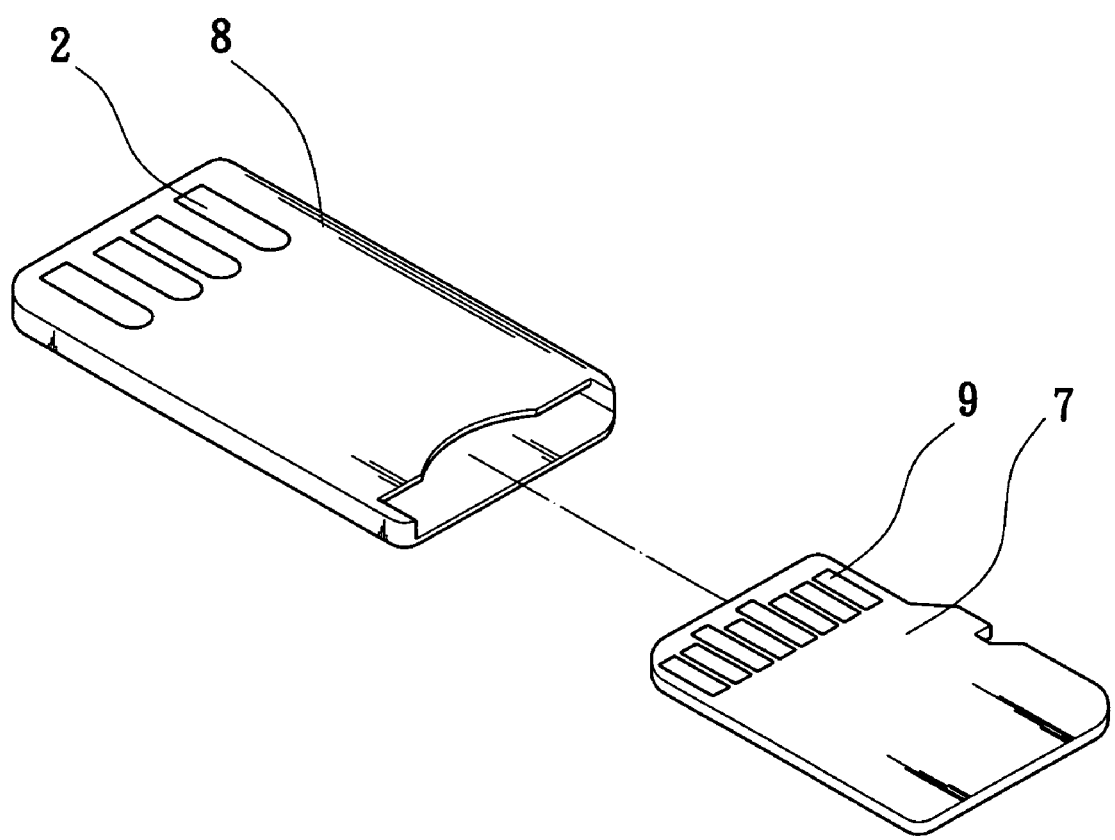
FIG. 4 is a perspective view of the slim card reader of another embodiment of the present invention.

Reference is made to FIG. 4. On the surface of the slim card reader 8, there are a plurality of metal flakes 2. The metal flakes 2 contact the conducting flakes of the female plugging slot of the USB port so that data in the memory card can be transmitted. The conducting part 9 located on the surface of the memory card 7 comprises a plurality of metal flakes for contacting the metal connection pins in the plugging slot of the slim card reader 8 to transmit data.

The description above only illustrates specific embodiments and examples of the invention. The invention should therefore cover various modifications and variations made to the herein-described structure and operations of the invention, provided they fall within the scope of the invention as defined in the following appended claims.

What is claimed is:

1. A slim card reader, comprising:
    a shell body, a first end of the shell body having a plugging slot that is plugged with a memory card, a plurality of metal connection pins being located in the plugging slot that contact a conducting part of the memory card, a second end of the shell body corresponding to a female plugging slot of a USB port and having a width and a height that is less than a width and a height of the female plugging slot of the USB port so that the second end can be inserted directly into the female plugging slot, on the surface of the second end of the shell body are a plurality of metal flakes that contact corresponding conducting flakes in the female plugging slot.

2. The slim card reader as claimed in claim 1, wherein a slip-proof structure is in the interior of the plugging slot of the slim card reader to prevent the memory card from coming out of the plugging slot.

3. The slim card reader as claimed in claim 1, wherein a plurality of metal flakes are on the surface of the shell body that replace a USB plugging head, the limitation produced by a metal external mask is solved, and the slim card reader is light, slim, and small.

4. The slim card reader as claimed in claim 1, wherein the metal flakes located on the surface of the shell body have conductivity.

5. The slim card reader as claimed in claim 1, wherein the height of the second end of the shell body is less than 3.22 millimeters.

6. The slim card reader as claimed in claim 1, wherein the width of the second end of the shell body is less than 12.5 millimeters.

7. The slim card reader as claimed in claim 1, wherein the height of the second end of the shell body is less than 3.22 millimeters, and the width of the second end of the shell body is less than 12.5 millimeters.

8. In combination,
    a USB port having a female plugging slot with a width of 12.5 millimeters, and a height of 3.22 millimeters; and
    a slim card reader, comprising:
        a shell body, a first end of the shell body having a plugging slot that is pluggable with a memory card, a plurality of metal connection pins being located in the plugging slot that contact a conducting part of the memory card, a second end of the shell body corresponding to the female plugging slot of the USB port and having a width and a height that is less than a width and a height of the female plugging slot of the USB port so that the second end can be inserted directly into the female plugging slot, on the surface of the second end of the shell body are a plurality of metal flakes that contact corresponding conducting flakes in the female plugging slot.

* * * * *